United States Patent
Wu (10) Patent No.: US 9,448,511 B2
(45) Date of Patent: Sep. 20, 2016

(54) INTERMEDIATE TRANSFER MEMBER

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1286 days.

(21) Appl. No.: 12/905,347

(22) Filed: Oct. 15, 2010

(65) Prior Publication Data

US 2012/0094013 A1    Apr. 19, 2012

(51) Int. Cl.
 B05D 5/12 (2006.01)
 G03G 15/01 (2006.01)
 G03G 15/16 (2006.01)
 C09D 11/52 (2014.01)

(52) U.S. Cl.
 CPC ............. G03G 15/161 (2013.01); C09D 11/52 (2013.01); G03G 15/162 (2013.01); G03G 2215/1623 (2013.01)

(58) Field of Classification Search
 None
 See application file for complete search history.

(56) References Cited

U.S. PATENT DOCUMENTS

| 2003/0143362 A1* | 7/2003 | Hsieh et al. | 428/58 |
| 2003/0233952 A1* | 12/2003 | Pan et al. | 101/217 |
| 2004/0054071 A1* | 3/2004 | Gobelt et al. | 524/588 |
| 2006/0002746 A1* | 1/2006 | Darcy et al. | 399/302 |
| 2009/0048379 A1* | 2/2009 | Weinberg et al. | 524/420 |

OTHER PUBLICATIONS

SciFinder, Polyphenyl Sulfone, retrieved Oct. 19, 2012, p. 1.*

* cited by examiner

*Primary Examiner* — Callie Shosho
*Assistant Examiner* — Patrick English
(74) *Attorney, Agent, or Firm* — Hoffman Warnick LLC (57) ABSTRACT

There is disclosed an intermediate transfer member comprising a belt comprising conductive particles dispersed in a thermoplastic polymer. The thermoplastic polymer is selected from the group consisting of polyimide, polyamideimide, polyetherimide, polycarbonate, polysulfone, polyethersulfone, polyphenylsulfone, polyester, polyphenylsulfide and polyamide. The belt has a welded seam. There is an overcoat disposed over the welded seam comprising a material selected from the group consisting of polyphenylsulfone, polysulfone and polyethersulfone. A method of manufacturing the intermediate transfer member is provided.

18 Claims, 2 Drawing Sheets

INTERMEDIATE TRANSFER MEMBER

BACKGROUND

1. Field of Use

This disclosure is directed to an image-forming apparatus and an intermediate transfer member.

2. Background

Image-forming apparatuses in which a color or black and white image is formed by using an intermediate transfer member to electrostatically transfer toner are well known. When an image is formed on a sheet of paper in a color image-forming apparatus using such an intermediate transfer member, four color images in yellow, magenta, cyan and black respectively are generally first transferred sequentially from an image carrier such as a photoreceptor and superimposed on the intermediate transfer member (the primary transfer). This full color image is then transferred to a sheet of paper in a single step (the secondary transfer). In a black and white image-forming apparatus, a black image is transferred from the photoreceptor, superimposed on an intermediate transfer member, and then transferred to a sheet of paper.

Certain intermediate transfer members are in the form of belts and contain a welded seam. These intermediate transfer belts (ITBs) having an overlap seam result in a belt with an irregular surface topology. This irregular surface topology makes it difficult for the cleaner blade to clean toner around the seam. Further, the irregular topology can cause damage to the cleaner blades by nicking the cleaning edge of the blade. The toner trapping from the poor cleaning and the blade damage results in streaking from the seam and creates an image quality problem. Many post fabrication seam-smoothing techniques, which remove material from the seam, also degrade seam strength.

Seam thicknesses have been reduced by a second welding pass across the seam, which further compresses the overlap and provides additional weld strength. Even with an almost smooth seam profile, toner trapping still exists, however to a much less extent, due to the poor cleaning. In addition, the seam resistivity increases in the region of the weld. Previous acrylic-based seam overcoats have demonstrated decreased seam printouts; however, the adhesion between the overcoat and the ITB was inadequate. It would be desirable to provide an ITB having a seam where the seam did not trap toner or change the surface resistivity in the region of the seam, and wherein the adhesion between the overcoat and the ITB is improved.

SUMMARY

According to various embodiments there is disclosed an intermediate transfer member comprising a belt including conductive particles dispersed in a thermoplastic polymer. The thermoplastic polymer is selected from the group consisting of polyimide, polyamideimide, polyetherimide, polycarbonate, polysulfone, polyethersulfone, polyphenylsulfone, polyester, polyphenylsulfide and polyamide. The belt has a welded seam. An overcoat is disposed over the welded seam, wherein the overcoat comprises a material selected from the group consisting of polyphenylsulfone, polysulfone and polyethersulfone.

According to various embodiments there is provided a method of forming an intermediate transfer member suitable for use with an image forming system. The method includes obtaining a belt comprising conductive particles dispersed in a thermoplastic polymer selected from the group consisting of polyimide, polyamideimide, polyetherimide, polycarbonate, polysulfone, polyethersulfone, polyphenylsulfone, polyester, polyphenylsulfide and polyamide, wherein the belt has a welded seam. A composition comprising a material selected from the group consisting of polyphenylsulfone, polysulfone and polyethersulfone and a solvent is coated over the welded seam. The composition is cured.

According to various embodiments, disclosed herein is an intermediate transfer member comprising a belt including conductive particles dispersed in a polyimide wherein the belt has a welded seam. An overcoat is disposed over the welded seam comprising a material selected from the group consisting of polyphenylsulfone, polysulfone and polyethersulfone and carbon black wherein the overcoat has a thickness of from about 1 microns to about 30 microns.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
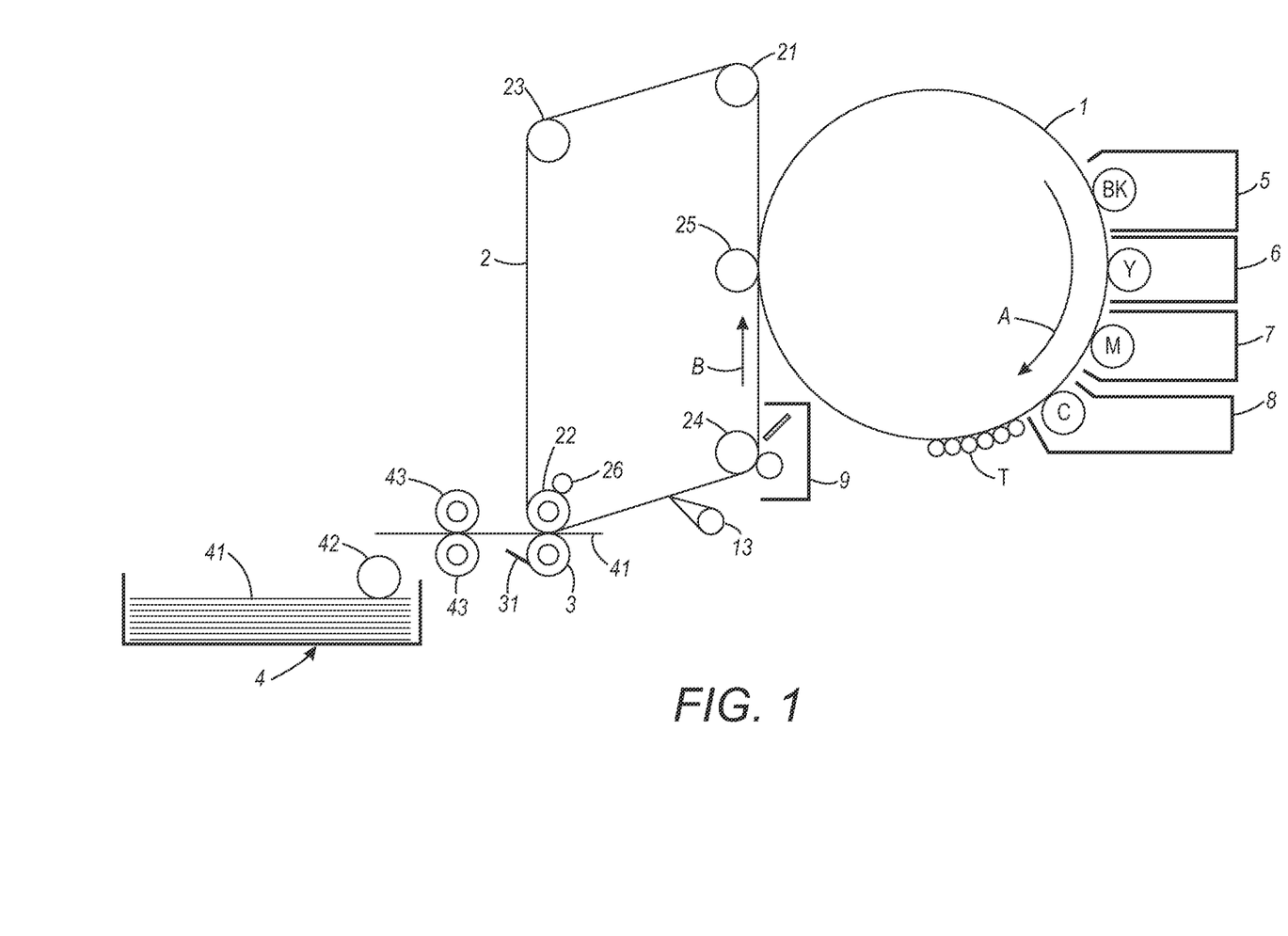
FIG. 1 is a schematic illustration of an image apparatus.

Referring to FIG. 1, an image-forming apparatus includes an intermediate transfer member as described in more detail below. The image-forming apparatus is an image-forming apparatus of an intermediate transfer system comprising a first transfer unit for transferring the toner image formed on the image carrier onto the intermediate transfer member by primary transfer, and a second transfer unit for transferring the toner image transferred on the intermediate transfer member onto the transfer material by secondary transfer. Also in the image-forming apparatus, the intermediate transfer member may be provided as a transfer-conveying member for conveying the transfer material in the transfer region for transferring the toner image onto the transfer material. Having the intermediate transfer member that transfers images of high quality and that remains stable for a long period is required.

The image-forming apparatus described herein is not particularly limited as far as it is an image-forming apparatus of intermediate transfer type, and examples include an ordinary monochromatic image-forming apparatus accommodating only a monochromatic color in the developing device, a color image-forming apparatus for repeating primary transfer of the toner image carried on the image carrier sequentially on the intermediate transfer member, and a tandem color image-forming apparatus having plural image carriers with developing units of each color disposed in series on the intermediate transfer member. More specifically, it may arbitrarily comprise an image carrier, a charging unit for uniformly charging the surface of the image carrier, an exposure unit for exposing the surface of the intermediate transfer member and forming an electrostatic latent image, a developing unit for developing the latent image formed on the surface of the image carrier by using a developing solution and forming a toner image, a fixing unit for fixing the toner unit on the transfer material, a cleaning unit for removing toner and foreign matter sticking to the image carrier, a destaticizing unit for removing the electrostatic latent image left over on the surface of the image carrier, and others by known methods as required.

As the image carrier, a known one may be used. As its photosensitive layer, an organic system, amorphous silicon, or other known material may be used. In the case of the image carrier of cylindrical type, it is obtained by a known method of molding aluminum or aluminum alloy by extrusion, and processing the surface. A belt form image carrier may also used.

The charging unit is not particularly limited, and known chargers may be used, such as a contact type charger using a conductive or semiconductive roller, brush, film and rubber blade, scorotron charger or corotron charge making use of corona discharge, and others. Above all, the contact type charging unit has excellent charge compensation capability. The charging unit usually applies DC current to the electrophotographic photosensitive material, but AC current may be further superposed.

The exposure unit is not particularly limited, and, for example, an optical system device may be used, which exposes a desired image on the surface of the electrophotographic photosensitive material by using a light source such as a semiconductor laser beam, LED beam, liquid crystal shutter beam or the like, or through a polygonal mirror from such light source.

The developing unit may be properly selected depending on the purpose, and, for example, a known developing unit for developing by using one-pack type developing solution or two-pack type developing solution, with or without contact, using brush and roller may be used.

The first transfer unit includes known transfer chargers such as a contact type transfer charger using a member, roller, film and rubber blade, and scorotron transfer charger or corotron transfer charger making use of corona discharge. Above all, the contact type transfer charger provides excellent transfer charge compensation capability. Aside from the transfer charger, a peeling type charger may be also used together.

The second transfer unit may be same as the first transfer unit such as a contact type transfer charger using a transfer roller and others, scorotron transfer charger and corotron transfer charger. By pressing firmly by the transfer roller of the contact type transfer charger, the image transfer stage can be maintained. Further, by pressing the transfer roller or the contact type transfer charger at the position of the roller for guiding the intermediate transfer member, the action of moving the toner image from the intermediate transfer member to the transfer material may be done.

As the photo destaticizing unit, for example, a tungsten lamp or LED may be used, and the light quality used in the photo destaticizing process may include white light of tungsten lamp and red light of LED. As the irradiation light intensity in the photo destaticizing process, usually the output is set to be about several times to 30 times of the quantity of light showing the half exposure sensitivity of the electrophotographic photosensitive material.

The fixing unit is not particularly limited, and any known fixing unit may be used, such as a heat roller fixing unit and an oven fixing unit.

The cleaning unit is not particularly limited, and any known cleaning device may be used.

A color image-forming apparatus for repeating primary transfer is shown schematically in FIG. 1. The image-forming apparatus shown in FIG. 1 includes a photosensitive drum 1 as an image carrier, a transfer member 2 as an intermediate transfer member such as a transfer belt, a bias roller 3 as a transfer electrode, a tray 4 for feeding paper as transfer material, a developing device 5 by BK (black) toner, a developing device 6 by Y (yellow) toner, a developing device 7 by M (magenta) toner, a developing device 8 by C (cyan) toner, a member cleaner 9, a peeling pawl 13, rollers 21, 23 and 24, a backup roller 22, a conductive roller 25, an electrode roller 26, a cleaning blade 31, a block of paper 41, a pickup roller 42, and a feed roller 43.

In the image-forming apparatus shown in FIG. 1, the photosensitive drum 1 rotates in the direction of arrow A, and the surface of the charging device (not shown) is uniformly charged. On the charged photosensitive drum 1, an electrostatic latent image of a first color (for example, BK) is formed by an image writing device such as a laser writing device. This electrostatic latent image is developed by toner by the developing device 5, and a visible toner image T is formed. The toner image T is brought to the primary transfer unit comprising the conductive roller 25 by rotation of the photosensitive drum 1, and an electric field of reverse polarity is applied to the toner image T from the conductive roller 25. The toner image T is electrostatically adsorbed on the transfer member 2, and the primary transfer is executed by rotation of the transfer member 2 in the direction of arrow B.

Similarly, a toner image of a second color, a toner image of a third color and a toner image of a fourth color are sequentially formed, and overlaid on the transfer member 2, and a multi-layer toner image is formed.

The multi-layer toner image transferred on the transfer member 2 is brought to the secondary transfer unit comprising the bias roller 3 by rotation of the transfer member 2. The secondary transfer unit comprises the bias roller 3 disposed at the surface side carrying the toner image of the transfer member 2, backup roller 22 disposed to face the bias roller 3 from the back side of the transfer member 2, and electrode roller 26 rotating in tight contact with backup roller 22.

The paper 41 is taken out one by one from the paper block accommodated in the paper tray 4 by means of the pickup roller 42, and is fed into the space between the transfer member 2 and bias roller 3 of the secondary transfer unit by means of the feed roller 43 at a specified timing. The fed paper 41 is conveyed under pressure between the bias roller 3 and backup roller 22, and the toner image carried on the transfer member 2 is transferred thereon by rotation of the transfer member 2.

The paper 41 on which the toner image is transferred, is peeled off from the transfer member 2 by operating the peeling pawl 13 at the retreat position until the end of primary transfer of the final toner image, and conveyed to the fixing device (not shown). The toner image is fixed by pressing and heating, and a permanent image is formed. After transfer of the multi-layer toner image onto the paper 41, the transfer member 2 is cleaned by the cleaner 9 disposed at the downstream side of the secondary transfer unit to remove the residual toner, and is ready for next transfer. The bias roller 3 is provided so that the cleaning blade 31 made of polyurethane or the like may be always in contact, and toner particles, paper dust and other foreign matter sticking by transfer are removed.

In the case of transfer of a monochromatic image, the toner image T after primary transfer is immediately sent to the secondary transfer process, and is conveyed to the fixing device, but in the case of transfer of a multi-color image by combination of plural colors, the rotation of the transfer member 2 and photosensitive drum 1 is synchronized so that the toner images of plural colors may coincide exactly in the primary transfer unit, and deviation of toner images of colors is prevented. In the secondary transfer unit, by applying a voltage of the same polarity (transfer voltage) as the polarity of the toner to the electrode roller 26 tightly contacting with the backup roller 22 disposed oppositely through the bias roller 3 and transfer member 2, the toner image is transferred onto the paper 41 by electrostatic repulsion. Thus, the image is formed.

The intermediate transfer member 2 can be of any suitable configuration. Examples of suitable configurations include a sheet, a film, a web, a foil, a strip, a coil, a cylinder, a drum, an endless mobius strip, a circular disc, a belt including an endless belt, an endless seamed flexible belt, an endless seamless flexible belt, an endless belt having a puzzle cut seam, and the like. In FIG. 1, the transfer member 2 is depicted as a belt.

In an image on image transfer, the color toner images are first deposited on the photoreceptor and all the color toner images are then transferred simultaneously to the intermediate transfer member. In a tandem transfer, the toner image is transferred one color at a time from the photoreceptor to the same area of the intermediate transfer member. Both embodiments are included herein.

Transfer of the developed image from the photoconductive member to the intermediate transfer member and transfer of the image from the intermediate transfer member to the paper can be by any suitable technique conventionally used in electrophotography, such as corona transfer, pressure transfer, bias transfer, and combinations of those transfer means, and the like.

The intermediate transfer member can be of any suitable configuration. Examples of suitable configurations include a sheet, a film, a web, a foil, a strip, a coil, a cylinder, a drum, an endless strip, a circular disc, a drelt (a cross between a drum and a belt), a belt including an endless belt, an endless seamed flexible belt, and an endless seamed flexible imaging belt.

Figure 2:
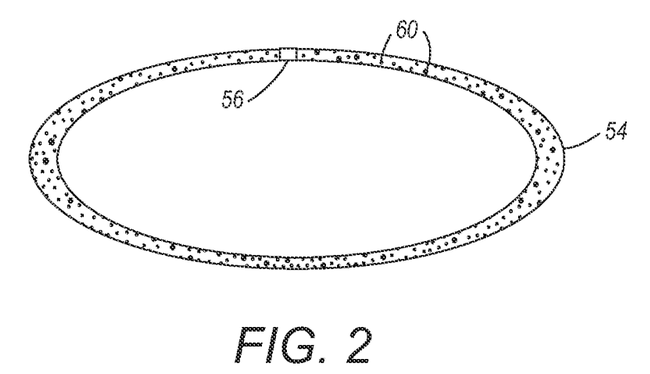
FIG. 2 is representation of an intermediate transfer belt having a welded seam.

In an embodiment shown in FIG. 2, the intermediate transfer member 54 is in the form of a belt. The intermediate transfer member 54 is a thermoplastic polymer. The intermediate transfer member 54 can include conductive particles 60 dispersed in the thermoplastic polymer. The conductive particles 60 control the surface resistivity of the intermediate transfer member. The thermoplastic polymer is selected a material including polyimides, polyamideimides, polyetherimides, polycarbonates, polysulfones, polyethersulfones, polyphenylsulfones, polyesters, polyphenylene sulfides and polyamides, or blends or alloys of such materials. The intermediate transfer member 54 contains a seam 56. The seam is from welding the two ends of the belt together to form the intermediate transfer member. The seam 56 can be reverse double welded without any other finishing steps such as sanding.

The intermediate transfer member 54 is composed of a thermoplastic polymer. The thermoplastic polymer can be selected from a number of materials Dispersed with the thermoplastic polymer are conductive particles 60 to control the surface resistivity.

The intermediate transfer member 54 contains a seam 56. The seam connects each end of the belt and can be welded ultrasonically, through thermal depression or laser processing.

Figure 3:
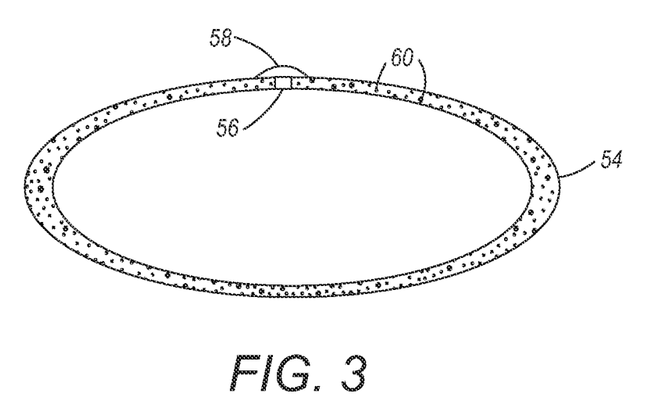
FIG. 3 is representation of an intermediate transfer belt having a welded seam with an overcoat disposed over the welded seam.

Shown in FIG. 3 is an intermediate transfer member (ITB) 54 in the form of a belt having an overcoat 58 over the seam 56. The overcoat is composed of a material selected from the group consisting of polyphenylsulfone, polysulfone and polyethersulfone. The overcoat 58 is mechanically robust and matches the surface resistivity of the ITB. The overcoat 58 adheres to the seam 56 of the ITB 54. The thickness of the overcoat is from about 1 microns to about 30 microns, or from about 2 microns to about 20 microns, or from about 5 to about 10 microns. The ITB 54 possesses a surface resistivity of from about $10^8$ to about $10^{13}$ ohm/square, or from about $10^{10}$ to about $10^{12}$ ohm/square. The overcoat 58 possesses a surface resistivity of from about $10^8$ to about $10^{13}$ ohm/square, or from about $10^{10}$ to about $10^{12}$ ohm/square. The surface resistivity difference between the ITB 54 and the overcoat 58 is less than 1 order of magnitude, or less than 0.5 order of magnitude, or less than 0.2 order of magnitude.

When the overcoat is composed of polyphenylsulfone, the structure can be represented by the following formula;

wherein n is from about 30 to about 5,000, or from about 80 to about 3,500, or from about 150 to about 3,000, and yet more specifically from about 200 to about 2,000.

The polyphenylsulfone polymer has a $T_g$ of about 220° C. and is soluble in common organic solvents such as N-methypyrrolidone (NMP), N,N-dimethylformamide (DMF), tetrahydrofuran (THF) and N,N'-dimethylacetamide (DMAc). Commercial polyphenylsulfone examples include RADEL® 5000NT, 5100NT, 5900NT, and the like, all available from Solvay Advanced Polymers, LLC, Alpharetta, Ga.

When the overcoat is composed of polysulfone, the structure is represented by;

wherein n is from about 30 to about 5,000, or from about 80 to about 3,500, or from about 150 to about 3,000, and yet more specifically from about 200 to about 2,000.

Commercial polysulfone examples include UDEL® P-1700, P-3500, and the like, all available from Solvay Advanced Polymers, LLC, Alpharetta, Ga.

When the overcoat is composed of polyethersulfone, the structure is represented by;

wherein n is from about 30 to about 5,000, or from about 80 to about 3,500, or from about 150 to about 3,000, and yet more specifically from about 200 to about 2,000.

Commercial polysulfone examples include RADEL® A-200A, AG-210NT, AG-320NT, VERADEL® 3000P, 3100P, 3200P, and the like, all available from Solvay Advanced Polymers, LLC, Alpharetta, Ga.

The disclosed seam overcoat 58 optionally comprises a leveling or smoothing agent such as a polysiloxane copolymer SILCLEAN® 3700 from BYK. The concentration of the polysiloxane copolymer is less than about 1 weight percent or less than about 0.2 weight percent or less than 0.05 weight percent. The optional polysiloxane copolymer includes a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); or a polyester polyether modified polydimethylsiloxane, commercially available from BYK Chemical with the trade name of BYK® 375 (about 25 weight percent in Di-propylene glycol monomethyl ether).

Examples of specific selected thermoplastic polyimides included in the intermediate transfer member 54 as the thermoplastic polymer are KAPTON® KJ, commercially available from E.I. DuPont, Wilmington, Del., as represented by wherein x is equal to 2; y is equal to 2; m and n are the same or different and are from about 10 to about 300; and IMIDEX®, commercially available from West Lake Plastic Company, as represented by wherein z is equal to 1, and q is from about 10 to about 300 EXTEM® XH-1005, commercially available from Sabic Innovative Plastics, as represented by wherein n is from about 10 to about 1,000.

Examples of polyamideimides that can be used as the thermoplastic polymer are VYLOMAX® HR-11NN (15 weight percent solution in N-methylpyrrolidone, $T_g=300°$ C., and $M_w=45,000$), HR-12N2 (30 weight percent solution in N-methylpyrrolidone/xylene/methyl ethyl ketone=50/35/15, $T_g=255°$ C., and $M_w=8,000$), HR-13NX (30 weight percent solution in N-methylpyrrolidone/xylene=67/33, $T_g=280°$ C., and $M_w=10,000$), HR-15ET (25 weight percent solution in ethanol/toluene=50/50, $T_g=260°$ C., and $M_w=10,000$), HR-16NN (14 weight percent solution in N-methylpyrrolidone, $T_g=320°$ C., and $M_w=100,000$), all commercially available from Toyobo Company of Japan, and TORLON® AI-10 ($T_g=272°$ C.), commercially available from Solvay Advanced Polymers, LLC, Alpharetta, Ga.

Examples of polyetherimides that can be used as the thermoplastic polymer are ULTEM® 1000 ($T_g=210°$ C.), 1010 ($T_g=217°$ C.), 1100 ($T_g=217°$ C.), 1285, 2100 ($T_g=217°$ C.), 2200 ($T_g=217°$ C.), 2210 ($T_g=217°$ C.), 2212 ($T_g=217°$ C.), 2300 ($T_g=217°$ C.), 2310 ($T_g=217°$ C.), 2312 ($T_g=217°$ C.), 2313 ($T_g=217°$ C.), 2400 ($T_g=217°$ C.), 2410 ($T_g=217°$ C.), 3451 ($T_g=217°$ C.), 3452 ($T_g=217°$ C.), 4000 ($T_g=217°$ C.), 4001 ($T_g=217°$ C.), 4002 ($T_g=217°$ C.), 4211 ($T_g=217°$ C.), 8015, 9011 ($T_g=217°$ C.), 9075, and 9076, all commercially available from Sabic Innovative Plastics.

Examples of polycarbonate polymers as the thermoplastic polymer are selected include poly(4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the thermoplastic polymers are comprised of bisphenol-A-polycarbonate resins, commercially available as MAKROLON®, with a weight average molecular weight of from about 50,000 to about 500,000.

Examples of polyphenylsulfone polymers as the thermoplastic polymer are represented by wherein n is from about 30 to about 5,000; and commercial polyphenylsulfone examples include RADEL® 5000NT, 5100NT, 5900NT, and the like, all available from Solvay Advanced Polymers, LLC, Alpharetta, Ga.

Examples of polysulfone polymers as the thermoplastic polymer are represented by wherein n is from about 30 to about 5,000; and commercial polysulfone examples include UDEL® P-1700, P-3500, and the like, all available from Solvay Advanced Polymers, LLC, Alpharetta, Ga.

Examples of polyethersulfone polymers as the thermoplastic polymer are represented by wherein n is from about 30 to about 5,000; and commercial polyethersulfone examples include RADEL® A-200A, AG-210NT, AG-320NT, VERADEL® 3000P, 3100P, 3200P, and the like, all available from Solvay Advanced Polymers, LLC, Alpharetta, Ga.

Examples of polyamide polymers as the thermoplastic polymer include aliphatic polyamides such as Nylon 6 and Nylon 66 from DuPont; semi aromatic polyamides, or polyphthalamides such as TROGAMID® 6T from Evonik Industries; and aromatic polyamides, or aramides such as KEVLAR® and NOMEX® from DuPont, and TEIJINCONEX®, TWARON® and TECHNORA® from Teijin.

Examples of polyester polymers as the thermoplastic polymer include aliphatic polyesters such as polyglycolic acid, polylactic acid and polycaprolactone; aliphatic copolyesters such as polyethylene adipate and polyhydroxyalkanoate; semi aromatic copolyesters such as polyethylene terephthalate (PET), polybutylene terephthalate (PBT), polytrimethylene terephthalate (PTT), and polyethylene naphthalate (PEN); aromatic copolyesters such as VECTRAN®.

Examples of polyphenylene sulfide polymers as the thermoplastic polymer include RYTON® polyphenylene sulfide by Chevron Phillips as cross-linked type of polymer, FORTRON® polyphenylene sulfide by Ticona as a linear polymer; and SULFAR® polyphenylene sulfide by Testori.

Electrically conductive particles 60 are dispersed in the thermoplastic polymer 54 or the seam overcoat 58, and help to control the surface resistivity and volume resistivity. The surface resistivity for both is controlled to from about $10^8$ ohms/square to about $10^{13}$ ohms/square, or from about $10^{10}$ ohms/square to about $10^{12}$ ohms/square. The volume resistivity for both is controlled to from about $10^8$ ohm-cm to about $10^{12}$ ohm-cm, or from about $10^9$ ohm-cm to about $10^{11}$ ohm-cm. The resistivity can be provided by varying the concentration of the conductive particles.

Examples of conductive particles include carbon blacks such as carbon black, graphite, acetylene black, fluorinated carbon black, and the like; metal oxides and doped metal oxides, such as tin oxide, antimony dioxide, antimony-doped tin oxide, titanium dioxide, indium oxide, zinc oxide, indium oxide, indium-doped tin trioxide, and polymers such as polyaniline and polythiophene, and mixtures thereof. The conductive particles 60 may be present in an amount of from about 0.1 parts by weight to about 50 parts by weight and or from about 3 parts by weight to about 40 parts by weight, or from about 5 parts by weight to about 20 parts by weight of the total solids of the intermediate transfer member.

Carbon black surface groups can be formed by oxidation with an acid or with ozone, and where there is absorbed or chemisorbed oxygen groups from, for example, carboxylates, phenols, and the like. The carbon surface is essentially inert to most organic reaction chemistry except primarily for oxidative processes and free radical reactions.

The conductivity of carbon black is primarily dependent on surface area and its structure; generally, the higher the surface area and the higher the structure, the more conductive the carbon black. Surface area is measured by the B.E.T. nitrogen surface area per unit weight of carbon black, and is the measurement of the primary particle size. The surface area of the carbon black described herein is from about 460 $m^2/g$ to about 35 $m^2/g$. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the ITM include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); Channel carbon blacks available from Evonik-Degussa; Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Further examples of conductive particles 60 include doped metal oxides. Doped metal oxides include antimony doped tin oxide, aluminum doped zinc oxide, antimony doped titanium dioxide, similar doped metal oxides, and mixtures thereof.

Suitable antimony doped tin oxides include those antimony doped tin oxides coated on an inert core particle (e.g., ZELEC®ECP-S, M and T) and those antimony doped tin oxides without a core particle (e.g., ZELEC®ECP-3005-XC and ZELEC®ECP-3010-XC, ZELEC® is a trademark of DuPont Chemicals Jackson Laboratories, Deepwater, N.J). The core particle may be mica, $TiO_2$ or acicular particles having a hollow or a solid core.

In another embodiment, the electrically conductive particles 60 include antimony doped tin oxide coated on an inert core particle (e.g., ZELEC® ECP-S, M and T). ZELEC® is a trademark of DuPont Chemicals Jackson Laboratories, Deepwater, N.J. The core particle may be mica, $TiO_2$ or acicular particles having a hollow or a solid core.

In another embodiment, antimony doped tin oxide particles are prepared by densely layering a thin layer of antimony doped tin oxide onto the surface of a silica shell or silica-based particle, wherein the shell, in turn, has been deposited onto a core particle. The crystallites of the conductor are dispersed in such a fashion so as to form a dense conductive surface on the silica layer. This provides optimal conductivity. Also, the particles are fine enough in size to provide adequate transparency. The silica may either be a hollow shell or layered on the surface of an inert core, forming a solid structure. Forms of antimony doped tin oxide are commercially available under the tradename ZELEC® ECP (electroconductive powders) from DuPont Chemicals Jackson Laboratories, Deepwater, N.J. Specific examples include antimony doped tin oxides are ZELEC® ECP 1610-S, ZELEC® ECP 2610-S, ZELEC® ECP 3610-S, ZELEC® ECP 1703-S, ZELEC® ECP 2703-S, ZELEC® ECP 1410-M, ZELEC® ECP 3005-XC, ZELEC® ECP 3010-XC, ZELEC® ECP 1410-T, ZELEC® ECP 3410-T, ZELEC® ECP-S-X1, and the like. Three commercial grades of ZELEC® ECP powders can be used and include an acicular, hollow shell product (ZELEC® ECP-S), an equi-axial titanium dioxide core product (ZELEC ECP-T), and a plate shaped mica core product (ZELEC® ECP-M).

A method of providing the overcoat 58 to a seamed thermoplastic polymer belt having a seam includes mixing the polyphenylsulfone, polysulfone or polyether sulfone and conductive particles in a solvent to form a dispersion. Examples of the solvent selected to form the dispersion include N,N-dimethylformamide, N-methylpyrrolidone, tetrahydrofuran, toluene, hexane, cyclohexane, heptane, monoclorobenzene, N,N'-dimethylacetamide, methylene chloride and mixtures thereof. The dispersion of polymer and conductive particles is coated on a seam of the thermoplastic intermediate transfer belt. Typical techniques for coating such materials on the seam of the intermediate transfer belt flow coating, liquid spray coating, dip coating, wire wound rod coating, fluidized bed coating, blade coating and the like. The coating is cured at temperatures of from about 75° C. to about 240° C., or from about 150° C. to about 200° C. for periods of from about 30 minutes to about 120 minutes, or from about 45 minutes to about 90 minutes to form the overcoat.

The adhesion force between the seamed ITB and the overcoat can be measured using an in-house 180 degree peel strength test as follow. The adhesion force test is carried out by cutting a minimum of three 1.0 inch by 6 inch ITB samples. For each sample, the overcoat is partially stripped from the test sample with the aid of a razor blade and then hand peeled to about 3.5 inches from one end to expose the bottom seamed ITB inside the sample. This stripped sample is then secured to a 2 inch by 6 inch 0.25 inch thick aluminum backing plate (having the overcoat facing the backing plate) with the aid of two sided adhesive tape. The end of the resulting assembly, opposite the end from which the overcoat is not stripped, is inserted into the upper jaw of an Instron Tensile Tester. The free end of the partially peeled overcoat layer is inserted into the lower jaw of the Instron Tensile Tester. The jaws are then activated at a one inch/min crosshead speed to peel the sample at least two inches at an angle of 180 degrees. The load recorded is then calculated to give the peel strength of the test sample. The peel strength is determined to be the load required for stripping the overcoat off from the bottom seamed ITB divided by the width (2.54 cm) of the test sample. The adhesion force between the overcoat and the bottom seamed ITB is greater than 30 grams Force/cm or DO NOT PEEL.

Specific embodiments will now be described in detail. These examples are intended to be illustrative, and not limited to the materials, conditions, or process parameters set forth in these embodiments. All parts are percentages by solid weight unless otherwise indicated.

Examples

The polyphenylsulfone overcoat dispersions were prepared via a homogenizer comprising RADEL® R-5000NT/special black 4/SILCLEAN® 3700=90/9.8/0.2, 87/12.8/0.2 and 84/15.8/0.2 in a solvent mixture of NMP/THF=1/1, where RADEL® R-5000NT was the polyphenylsulfone obtained from Solvay, special black 4 was the carbon black obtained from Evonik, and SILCLEAN® 3700 was the siloxane copolymer leveling agent obtained from BYK.

A 75 micron thick polyimide KAPTON® KJ/polyanilne=90/10 thermoplastic ITB film obtained from DuPont was reverse double welded via ultrasonication, and the seam thickness was about 100 microns with a 250 micron overlap. The surface resistivity of the ITB film was about 2.1×10$^{12}$ ohm/square as measured by a High Resistivity Meter, and the polyimide polymer can be represented by wherein x is equal to 2; y is equal to 2; m and n are the same or different and are from about 10 to about 300.

An overcoat having a thickness of about 10 microns was formed on top of the above reverse double welded seam after a thermal cure at 150° C. for 30 minutes. These overcoated seam patches were ultrasonically welded into a full-size ITB for printing test on a XEROX DC8000 printer. After 100 prints, 50% halftone images were visually evaluated (Table 1). Other data such as surface resistivity of the overcoat as well as the adhesion force between the overcoat and the bottom ITB were also included.

TABLE 1

| Overcoat description | Seam printouts | Overcoat resistivity (ohm/square) | Adhesion (gram Force/cm) |
|---|---|---|---|
| RADEL ® R-5000NT/special black 4/SILCLEAN ® 3700 = 90/9.8/0.2 | Yellow (no); Magenta (slight); Cyan (slight); black (slight) | 4.8 × 10$^{14}$ | DO NOT PEEL |
| RADEL ® R-5000NT/special black 4/SILCLEAN ® 3700 = 87/12.8/0.2 | Yellow (no); Magenta (no); Cyan (no); black (no) | 2.3 × 10$^{12}$ | DO NOT PEEL |
| RADEL ® R-5000NT/special black 4/SILCLEAN ® 3700 = 84/15.8/0.2 | Yellow (no); Magenta (less slight); Cyan (less slight); black (less slight) | 7.1 × 10$^{10}$ | DO NOT PEEL |

No seam printouts in different color halftone images including yellow, magenta, cyan and black were seen when the resistivity of the polyphenylsulfone overcoat (RADEL® R-5000NT/special black 4/SILCLEAN® 3700=87/12.8/0.2, surface resistivity of 2.3×10$^{12}$ ohm/square) matched that of the bottom polyimide ITB (about 2.1×10$^{12}$ ohm/square). Otherwise, some color halftone images still showed seam printouts when the surface resistivity did not match between the overcoat and the bottom polyimide ITB, for examples, the RADEL® R-5000NT/special black 4/SILCLEAN® 3700=90/9.8/0.2 and RADEL® R-5000NT/special black 4/SILCLEAN® 3700=84/15.8/0.2 overcoat.

In addition, the adhesion between the polyphenylsulfone overcoat and the bottom seamed polyimide ITB was excellent (DO NOT PEEL, or usually greater than 30 grams Force/cm) when compared with the previous acrylic based overcoats (about 5 grams Force/cm). In conclusion, provided herein is a seam overcoat composition and a method of preparing an imageable seamed ITB.

It will be appreciated that variants of the above-disclosed and other features and functions or alternatives thereof, may be combined into other different systems or applications. Various presently unforeseen or unanticipated alternatives, modifications, variations, or improvements therein may be subsequently made by those skilled in the art which are also encompassed by the following claims.

What is claimed is:

1. An intermediate transfer member comprising:
   a belt comprising conductive particles dispersed in a thermoplastic polymer selected from the group consisting of polyimide, polyamideimide, polyetherimide, polycarbonate, polysulfone, polyethersulfone, polyphenylsulfone, polyester, polyphenylsulfide and polyamide and mixtures thereof wherein the belt has a welded seam; and
   an overcoat disposed over the welded seam comprising a material selected from the group consisting of polyphenylsulfone and polysulfone and mixtures thereof wherein the overcoat has a thickness of from about 1 micron to about 30 microns.

2. The intermediate transfer member of claim 1 wherein the polyphenylsulfone is represented by the structure;

wherein n is from about is from about 30 to about 5,000.

3. The intermediate transfer member of claim 1 wherein the polysulfone is represented by the structure;

wherein n is from about 30 to about 5,000.

4. The intermediate transfer member of claim 1 wherein the conductive particles are selected from the group consisting of carbon black, graphite, acetylene black, fluorinated carbon black, metal oxides, doped metal oxides, polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

5. The intermediate transfer member of claim 1, wherein the overcoat further comprises conductive particles selected from the group consisting of carbon black, graphite, acetylene black, fluorinated carbon black, metal oxides, doped metal oxides, polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

6. The intermediate transfer member of claim 1, wherein the overcoat further comprises a leveling agent.

7. The intermediate transfer member of claim 6, wherein the leveling agent comprises a polysiloxane copolymer.

8. A method of forming an intermediate transfer member suitable for use with an image forming system, comprising:
obtaining a belt comprising conductive particles dispersed in a thermoplastic polymer selected from the group consisting of polyimide, polyamideimide, polyetherimide, polycarbonate, polysulfone, polyethersulfone, polyphenylsulfone, polyester, polyphenylsulfide and polyamide wherein the belt has a welded seam;
coating a composition comprising a material selected from the group consisting of polyphenylsulfone and polysulfone and a solvent over the ultrasonically welded seam; and
curing the composition to form an overcoat having a thickness of from about 1 micron to about 30 microns.

9. The method of claim 8 wherein the polyphenylsulfone is represented by the structure;

wherein n is from about is from about 30 to about 5,000.

10. The method of claim 8 wherein the polysulfone is represented by the structure;

wherein n is from about 30 to about 5,000.

11. The method of claim 8 wherein the conductive particles are selected from the group consisting of carbon black, graphite, acetylene black, fluorinated carbon black, metal oxides, doped metal oxides, polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

12. The method of claim 8 wherein the solvent is selected from the group consisting of N,N-dimethylformamide, N-methylpyrrolidone, tetrahydrofuran, toluene, hexane, cyclohexane, heptane, monoclorobenzene, N,N'-dimethylacetamide, methylene chloride and mixtures thereof.

13. The method of claim 8, wherein the composition further comprises conductive particles selected from the group consisting of carbon black, graphite, acetylene black, fluorinated carbon black, metal oxides, doped metal oxides, polyaniline, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene and mixtures thereof.

14. The method of claim 8, wherein the composition further comprises a leveling agent.

15. The method of claim 14, wherein the leveling agent comprises a polysiloxane copolymer.

16. An intermediate transfer member comprising:
a belt comprising conductive particles dispersed in a polyimide wherein the belt has a welded seam; and
an overcoat disposed over the welded seam comprising a material selected from the group consisting of polyphenylsulfone and polysulfone and carbon black wherein the overcoat has a thickness of from about 1 micron to about 30 microns.

17. The intermediate transfer member of claim 16 wherein the polyphenylsulfone is represented by the structure;

the polysulfone is represented by the structure;

wherein n is from about 30 to about 5,000.

18. The intermediate transfer member of claim 16 wherein a surface of the member comprises a surface resistivity of from about $10^8$ ohm/sq to about $10^{13}$ ohm/sq.

* * * * *